July 24, 1934.  M. J. DAVIS  1,967,997
STABILIZER FOR MOTOR VEHICLES
Filed Sept. 21, 1933    2 Sheets-Sheet 1
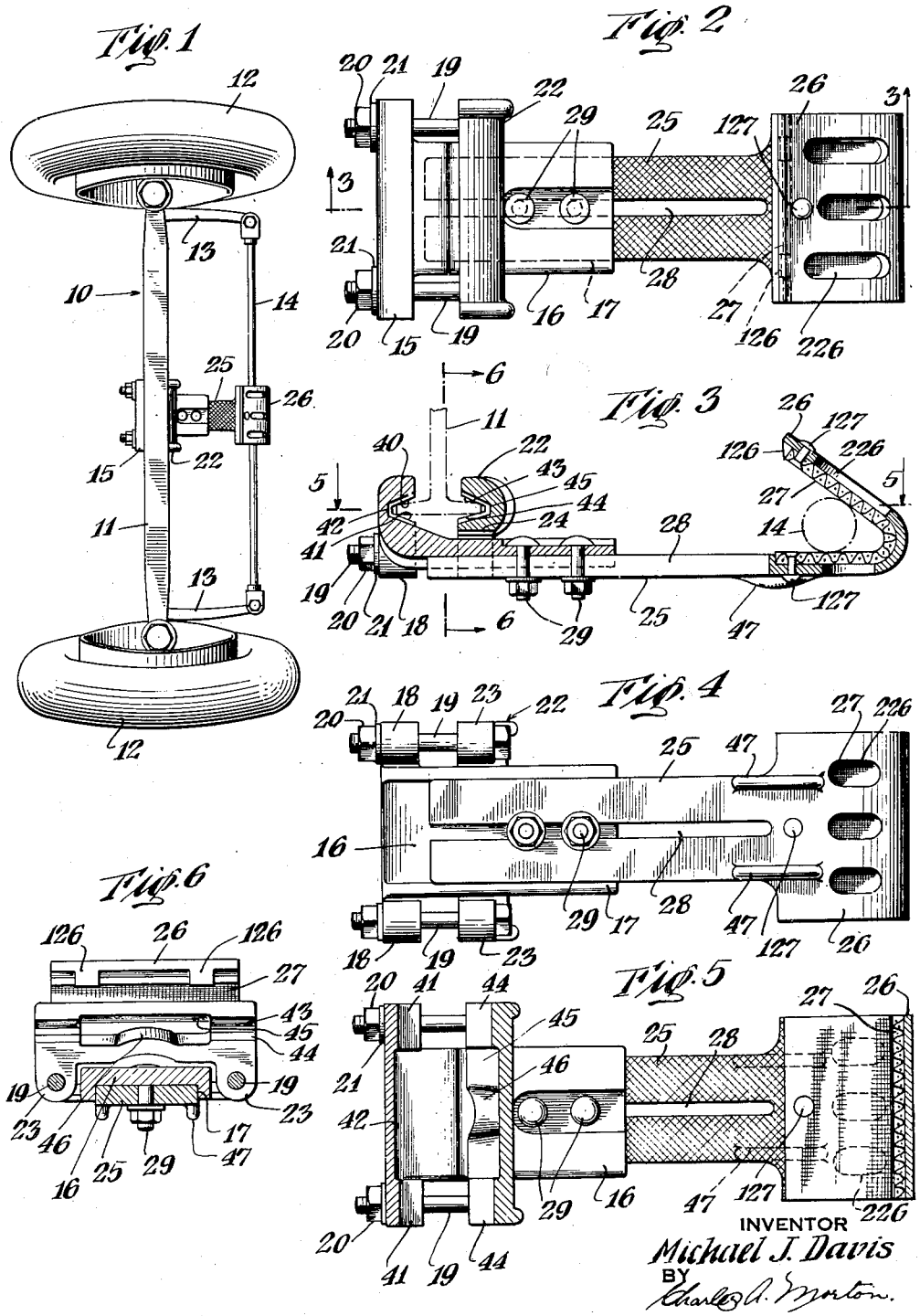
INVENTOR
Michael J. Davis
BY
Charles A. Morton.
ATTORNEY

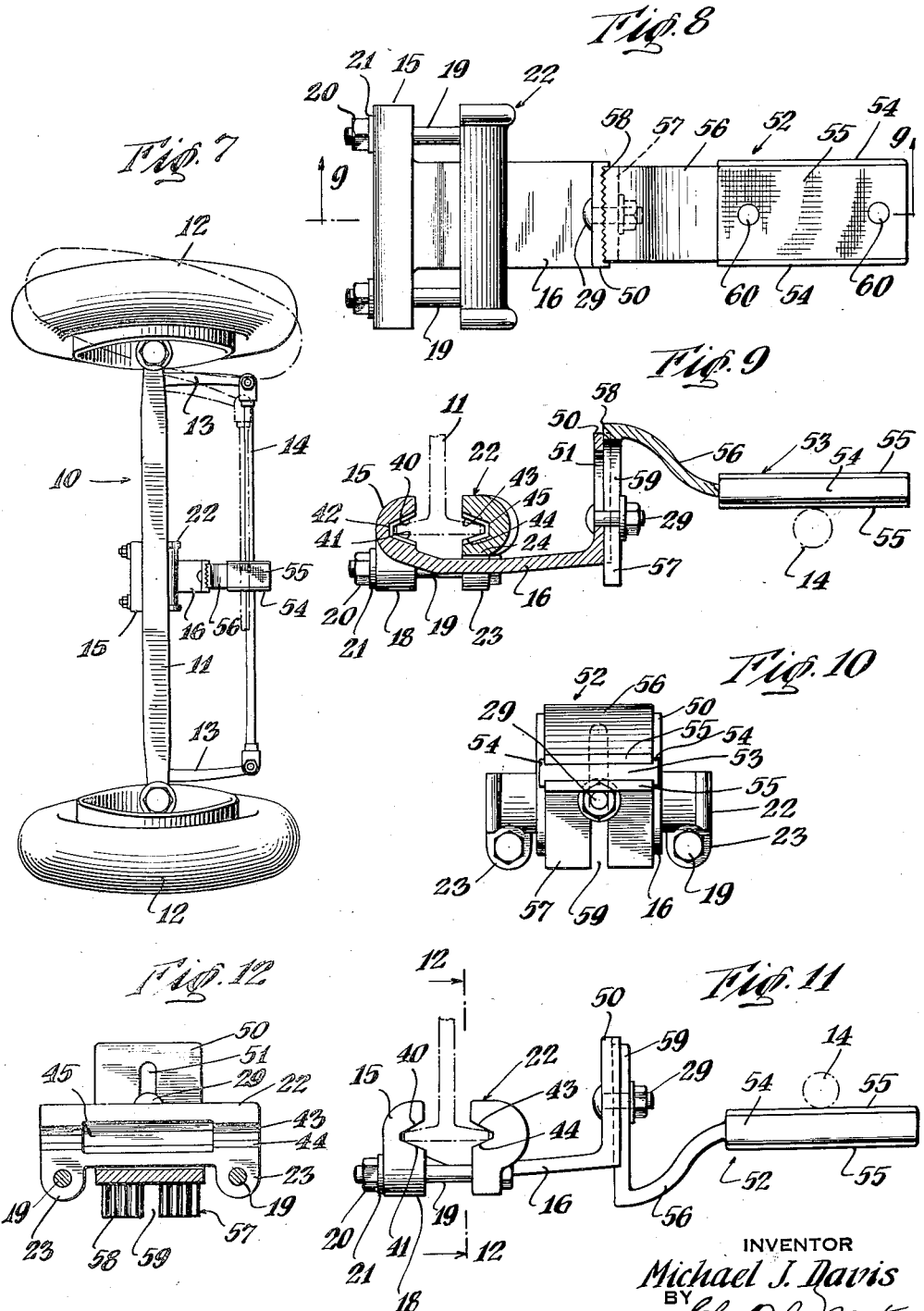

Patented July 24, 1934

1,967,997

UNITED STATES PATENT OFFICE

1,967,997

STABILIZER FOR MOTOR VEHICLES

Michael J. Davis, Brooklyn, N. Y., assignor to Clara Davis, Brooklyn, N. Y.

Application September 21, 1933, Serial No. 690,413

2 Claims. (Cl. 280—89)

This invention relates to improvements in stabilizers for motor vehicles and more particularly to improvements in the stabilization of the steering system; the present application being a continuation in part of my co-pending applications, Serial Number 564,994, filed September 25, 1931 and Serial Number 644,197, filed November 25, 1932.

One object of this invention is the improvement of the steering characteristics of a motor vehicle.

Another object of this invention is the elimination of what is commonly known as "shimmying".

Another object of this invention is the prevention of distortion of the steering or connecting rods and/or the alignment of the front wheels of a motor vehicle.

In accordance with this invention means secured to the axle of the front or steering wheels of a motor vehicle is caused to engage with the connecting rod between the front wheels to resiliently bridge the mid-section of the connecting rod to the fixed framework of the motor vehicle when the wheels are aligned in straight forward running position, to prevent any jar or vibration communicated to said connecting rod by one front wheel from being communicated to the other front wheel, thereby preventing the wheels from turning and swerving the motor vehicle from its true course.

In the drawings comprising two sheets of 12 figures numbered Figures 1 to 12 inclusive.

Fig. 1 is a plan view of the front or steering wheels.

Fig. 2 is a top plan view of a stabilizer.

Fig. 3 is a vertical sectional view taken along the line 3—3 of Fig. 2 looking in the direction of the arrows.

Fig. 4 is a bottom plan view of a stabilizer of Fig. 2 viewed from below.

Fig. 5 is a sectional view taken along the line 5—5 of Fig. 3 looking in the direction of the arrows.

Fig. 6 is a cross-sectional view taken along the line 6—6 of Fig. 3 looking in the direction of the arrows.

Fig. 7 is a plan view of the front or steering wheels showing a modified form of stabilizer assembly.

Fig. 8 is a plan view of a modified form of stabilizer shown in Fig. 7.

Fig. 9 is a sectional view of said modified form taken along the line 9—9 of Fig. 8 looking in the direction of the arrows.

Fig. 10 is an end view of the device of Figure 8 looking from the left of the said figure.

Fig. 11 is a side view with certain of the parts relatively reversed; and

Fig. 12 is a sectional view taken along the line 12—12 of Fig. 11 looking in the direction of the arrows.

Like reference characters designate corresponding parts throughout the several figures of the drawings.

Heretofore as disclosed in my aforesaid co-pending applications it has been proposed to employ a concave lined shoe conforming in configuration to the configuration of a central sector of the steering rod, and to adjust said steering rod to exert pressure against the lined face of said shoe when the front wheels are in straight forward running position. Exerting pressure mid-way of the steering rod tends to bow or bend it in the middle, and this in turn tends to change the position of the lever arms controlling the steering wheels thereby introducing an error in the alignment of the latter, and the more the steering rod is bowed or bent by the pressure of the lined shoe the greater this error becomes. As is well-known any error in the alignment of the front or steering wheels of a motor vehicle tends to quickly wear out the front tire treads thereby greatly shortening the useful life of the tires. In the present invention the lined shoe is so arranged that the steering rod will not be bowed or bent so that the alignment of the front or steering wheels is not impaired.

Referring to Figure 1, the front or steering wheel unit 10, consists essentially of wheels 12—12 rotatably mounted on spindles which are carried by the usual steering knuckles, pivotally mounted to opposite ends of axle 11. The movement of the wheels 12—12 is controlled by the lever arms 13—13 which are connected to opposite ends of connecting rod 14, to which the shaft of the steering wheel (not shown) is intended to be secured, so that by turning the steering wheel the connecting rod 14 is caused to move to actuate lever arms 13—13 and turn wheels 12—12.

One form of my improved stabilizer is shown in Figures 2 to 6 inclusive. It consists of an angular shoe 26 having an angular lining 27 conforming in contour to the inner angular face of shoe 26. The lining 27 may be of any suitable type, the type of lining used for lining the brakes of motor vehicles giving good results. The shoe 26 is provided with an extension length or shank 25, having a centrally disposed slot 28, for receiving the bolts 29—29. The clamping member 15 is grooved to fit the axle 11; a second clamping member 22 similarly grooved, and suitable bolts 19—19, pass through holes in the ears 18—18 of clamping member 15, and 23—23 of clamping member 22. The bolts 19—19 are provided with nuts 20—20 operable against washers 21—21 to draw clamping members 15 and 22 together to securely clamp axle 11 between said clamping members (compare Figs. 1 and 3).

Clamping member 15 is provided with spaced jaws 41—41 having beveled walls 40—40 defining a substantially V shaped gripping surface. Between jaws 41—41, clamping member 15 is recessed as indicated at 42 (Fig. 5), to compensate for blisters or other irregularities in the axle 11. Clamping member 22 is likewise provided with jaws 44—44 (Fig. 5) having beveled walls 43—43 (Fig. 3) defining a substantially V shaped gripping surface; said clamping member 22 is also recessed between jaws 44—44 (Fig. 5) to compensate for blisters and other irregularities in the axle 11. Clamping member 22 is arched at 46 to afford clearance for the button shaped heads of the bolts 29—29 (see Fig. 5). When the clamping members 15 and 22 are tensioned upon the axle 11 by means of the nuts 20—20 and bolts 19—19, the axle is firmly gripped at four points between the oppositely disposed pairs of jaws 41 and 44 which are in line with the oppositely disposed pairs of ears 18 and 23, constituting the areas of maximum clamping effect. The recesses 42 and 45 (Fig. 5) are sufficiently large to receive and accommodate the blisters and other irregularities in the surface of the axle 11 thereby preventing them from interfering with the correct alignment of the stabilizer when it is clamped in position.

One of the clamping members, for example 15, is provided with an extension shank 16, having a longitudinal guide-way 17 therein, adapted to receive shank 25 of shoe 26. Extension shank 16 is provided with openings for the bolts 29—29, which may be adjusted to lock shank 25 of shoe 26 to extension shank 16 of clamping member 15. Adjacent faces of the shank members 25 and 16 are serrated, burred, or otherwise roughened to afford a better gripping surface thereby maintaining the shank members in cooperative registry by preventing slippage between said members. The clamping action of bolts 19—19 and jaws 41—44 is evenly distributed on opposite sides of the shank members 16 and 25, eliminating any tendency to rock the shank members when the tie-rod 14 in its movement into and out of angular shoe 26 is off center relative to the shoe and is engaging either extreme end thereof. If a single centrally disposed clamping bolt were employed as a substitute for the bolts 19—19 there would be a tendency to rock the stabilizer and gradually loosen up said bolts. Similarly failure to recess the clamping members 15 and 22 at 42 and 45 respectively (Fig. 5) tends to prevent the true alignment of the stabilizer against blisters and irregularities in the axle 11. The double bolt clamping action tensioning the two pairs of jaws 41—44 against the axle 11 affords a four point hold, which effectively locks the stabilizer to the axle 11 adjacent the areas of maximum clamping effect, and any tendency to loosen the clamping members 15 and 22 is thus entirely overcome.

The clamping members 15 and 22 are designed to engage the axle 11 formed from channel iron (see Fig. 3), but in the event the axle 11 were round (or of some other shape) the clamping members 15 and 22 could be suitably modified to conform to the shape of the axle.

The shoulders of the longitudinal guide-way 17 impart additional rigidity to shank 25 when the same is clamped in proper position by the bolts 29—29 thus locking shanks 16 and 25 against relatively lateral movement. If the longitudinal guide-way 17 were omitted and a single bolt 29 were used, there would be a tendency for shank 25 to turn relative to shank 16 about the single bolt as a pivot thus throwing the stabilizer out of correct alignment. By using two bolts 29—29 spaced apart this tendency to permit shank 25 to turn relative to shank 16 is avoided, and the shoulders of the longitudinal guide-way 17 (see Figs. 4 and 6) serve to augment this locking feature so that the shanks are firmly interlocked against any tendency to turn and loosen bolts 29—29. As the slightest departure from correct alignment of the stabilizer may seriously impair proper steering of the motor vehicle to which the device is attached, it is very essential that after the stabilizer has once been correctly aligned all risk of accident which in alignment during the operation of the vehicle be eliminated as far as possible.

It thus appears that the double bolt axle clamp gripped at four spaced points by the oppositely disposed pairs of jaws 41 and 44, the interlocking of shanks 16 and 25 by the shoulders of longitudinal guide-way 17, the provision of serrations upon the adjacent faces of shank members 25 and 16, and the use of the two bolts 29—29, all serve to effect unchangeable alignment of the stabilizer and stabilizer parts after it has once been placed in correct adjustment.

It should be observed that the shoe 26 and shank 25 are made in one piece preferably in the form of a malleable casting so that the shoe and shank are rigidly secured together against relative movement. It should also be observed that the shanks 25 and 16 form a straight line adjustment with the clamping members 15 and 22 and the axle 11 so that there are no low hanging parts to obstruct the free passage of the under-carriage of the vehicle. By using the adjustable two-piece clamp partially encircling the axle 11 and conforming to the contour thereof it becomes unnecessary to drill holes in the axle in order to secure the stabilizer in position; this is an advantage because only garages having machine shop equipment could install the stabilizers if it were necessary to drill the axle, and an incompetent mechanic might substantially impair the strength of the axle during the drilling operation.

Shoe 26 is rabbeted adjacent the point of merger with its shank 25, to define a shoulder for the lining 27. The stops 126 retain the outer end of lining 27 in position, and the action of the shoulder and of the stops 126 is augmented by the rivets 127—127 which pass through the lining and through holes drilled in the angular shoe 26 to retain lining 27 in fixed position. The side walls or jaws of shoe 26 are arranged at such an angle that the steering rod 14 will always be spaced away from the apex of the shoe, so that the lining 27 will only bear against the steering rod 14 at two separate radially disposed points, and the free end of the shoe will have a certain amount of resiliency as will the lining 27, so that in the straight forward running position of the motor vehicle the lining 27 will be in frictional engagement with two spaced radial sections of the steering rod 14 but with the apex of shoe or friction guide 26 spaced from steering rod 14 (see Figs. 1 and 3), and the lining 27 being self-resilient will tend to assume the contour of the steering rod at the points of frictional contact without bending or bowing the steering rod thereby throwing the steering wheels out of proper alignment, which frequently occurs in existing devices having shoe 26 conforming to the configuration of the steering rod 14, and adjusted snugly relative thereto. Shoe or friction guide 26 is cut away to define the elongated recesses 226 (Figs. 2, 3 and 4) to conserve metal, for strength, and to accommodate the compressed lining 27, when pressure is exerted on said lining.

The outwardly diverging (angular) side walls or jaws of shoe or friction guide 26 are self-adjustable to steering rods of varying diameters and may be further separated as by bending if desired, whereby the shoe 26 becomes in effect a universal friction guide for any type motor vehicle. The steering rod 14 indicated in dotted outline in Fig. 3, which is assumed to be of minimum diameter, is spaced a substantial distance from the apex formed by the side walls or jaws of shoe or friction guide 26; steering rods of larger diameter will be spaced at a still greater distance from the apex and will be frictionally engaged at two widely spaced radially disposed points by the said side walls or jaws. It should be observed that the side walls or jaws of the shoe or friction guide 26 define an acute angle, thereby wedging the tie-rod 14 in spaced relation to the apex of the shoe or friction guide 26.

The clamping member 15 and shank 16 are formed from a single piece of metal, the clamping member 15 hooking around the side of the axle 11 remote from the tie-rod 14 so that when the tie-rod engages the shoe 26 there will be a direct pull exerted by hooked clamping member 15 upon the side of axle 11 remote from the tie-rod 14, and the strain imparted by pressure exerted by the tie-rod 14 upon clamping member 15 will therefore be resisted not only by the clamping member 15 and the bolts 19—19 but also by the axle 11. This hooking effect therefore serves to augment the action of the bolts 19—19 and the clamping members 15 and 22. If the clamp were bolted directly to the wall of the axle 11 adjacent tie-rod 14, any strain imparted to the stabilizer by the pressure of the tie-rod 14 exerted against the shoe 26 would be taken up by the bolts passing through the clamp and the axle, and the strain upon the clamp would tend to separate the clamp from the axle rather than to draw them together. Such a construction would not utilize the strain resisting characteristics of the axle 11, and the tendency of the clamping bolts would be to loosen up thereby rendering the stabilizer much less stable than in the construction herein described.

At the point of merger between shoe 26 and shank 25 a plurality of reinforcing ribs 47—47 are provided for strengthening the shank and shoe to eliminate any tendency of the shank or shoe to bend or break at the point of merger due to the pressure exerted by the tie-rod 14 or from any other cause. These reinforcing ribs are preferably molded as an integral part of the shank and shoe and may be disposed parallel and substantially in alignment with the side walls of the shank 25 thereby reinforcing the shank and the shoe at the point defined by the angle formed between them.

The method of adjustment is as follows:

The clamping members are secured to the middle point of the axle 11, and the bolts 19 loosely drawn into place; bolts 29—29 are then loosened and shoe 26 is adjusted until it frictionally engages the connecting rod 14 at two radially spaced points when the wheels are in straight forward running position; the steering wheel is now moved to cause the connecting rod 14 to move towards the axle a fraction of an inch, and the shoe 26 is now moved towards the steering rod to reduce the separation between the shoe and the clamping member a fraction of an inch and all bolts are then fully tightened. When the front wheels are restored to the straight forward running position, two radially spaced points of connecting rod 14 will frictionally engage two similarly spaced points of the lining 27. A slight jolt of one wheel 12 transmitted to connecting rod 14 will not pass beyond the bridge formed by the clamp and shoe between the rod 14 and axle 11, but will be absorbed or dissipated without affecting the position of the other wheel 12. As both the lining 27 and the free ended side wall of angular shoe 26 have a certain degree of resiliency, the jar of the wheel 12 may momentarily rock the tie-rod 14 closer to the apex of the angular shoe 26 without distorting said tie-rod. In this manner the trouble commonly known as "shimmying" is eliminated without injury to the tie-rod. The device will not interfere with the normal operation of the steering wheel but will actually ease the steering burden by assisting the operator in keeping the motor vehicle headed straight on the road. In this way the car is stabilized and its correct operation facilitated.

Figures 7 to 12 inclusive show a modified form of stabilizer wherein a flat friction member 52 is substituted for the angular shoe 26 shown in the preceding figures of the drawings.

This device is provided with clamping members 15 and 22 secured together by bolts 19—19, nuts 20—20 and washers 21—21 as before. The shank 16 however is provided with a bracket 50 having a slotted guide-way 51 for receiving a slotted shank 57 which in turn is secured to the flat friction member 52 by a link 56. Slotted shank 57 is adjustable relative to the slotted guide-way 51 and may be locked in any desired position by means of clamping bolts 29. Adjacent faces of guide-way 51 and slotted shank 57 are serrated (as at 58, Figs. 8 and 12) to afford a better gripping surface thereby maintaining the said guide-way and shank in co-operative registry by preventing slippage.

Oppositely disposed faces of the flat friction member 52 are provided with strips of brake lining 55—55 which are riveted at 60—60 to the metal base 54 of friction member 52.

Friction member 52 may be adjusted to engage against the upper edge of tie-rod 14 as shown in Fig. 9, or it may be removed from bracket 50 and reversed as shown in Fig. 11 to engage with the underside of tie-rod 14. As the shank 59 is slidably adjustable relative to bracket 50 the form of stabilizer shown in Figs. 8 to 12 inclusive can be universally applied to any type of motor vehicle having a large or small tie-rod. In this form of device there is no risk whatsoever that the momentary jarring of the tie-rod will cause any bending or other distortion thereof.

What is claimed is:

1. In a stabilizer for the steering wheels of a motor vehicle and in combination, a two piece adjustable clamp having a plurality of oppositely disposed pairs of spaced jaws for gripping the axle carrying the steering wheel at a plurality of spaced points, means operable to lock the clamp to the axle at said spaced points, a V-shaped shoe having converging side walls, the bottom of the V being of less diameter than the rod, defining an angularly disposed opening for frictionally engaging the connecting rod at two separate and spaced points to control steering of the wheels and a shank portion slidably adjustable relative to the clamp to vary the position of said shoe relative to said connecting rod, and means operable to lock said shank to said clamp at a plurality of spaced points when said shoe is in proper frictional engagement with said rod.

2. In a stabilizer for the steering wheels of a motor vehicle, the combination of a clamping member for securing the stabilizer to the axle of the vehicle, a member for frictionally engaging the connecting rod between the steering wheels comprising a V-shaped shoe in which the bottom of the V is of less diameter than the connecting rod so that the latter is engaged at substantially diametrically opposite points between the converging walls of the shoe and adjustable supporting connections between said shoe and said clamping member for adjusting the distance of said shoe from the axle.

MICHAEL J. DAVIS.